United States Patent [19]

Larson et al.

[11] 4,195,856
[45] Apr. 1, 1980

[54] HIGH LIFT TAG AXLE LOAD TRANSFER SYSTEM

[75] Inventors: Thomas A. Larson; Donald H. Verhoff; Wallace J. Blank, all of Oshkosh, Wis.

[73] Assignee: Oshkosh Truck Corporation, Oshkosh, Wis.

[21] Appl. No.: 882,366

[22] Filed: Mar. 1, 1978

[51] Int. Cl.² .............................................. B60S 9/12
[52] U.S. Cl. ................. 280/81 R; 180/24.02; 280/43.23; 280/704
[58] Field of Search .................... 280/81 R, 43, 43.17, 280/43.23, 704; 180/24.02

[56] References Cited

U.S. PATENT DOCUMENTS

| 2,333,853 | 11/1943 | Fellabaum | 280/81 R |
|---|---|---|---|
| 2,902,289 | 9/1959 | North | 280/81 R |
| 3,038,704 | 6/1962 | Cook | 280/81 R |
| 3,479,049 | 11/1969 | Duecy | 280/81 R |
| 3,685,853 | 8/1972 | Goldsmith | 280/81 R |
| 4,082,305 | 4/1978 | Allison et al. | 280/43.23 X |

*Primary Examiner*—Joseph F. Peters, Jr.
*Assistant Examiner*—Michael Mar
*Attorney, Agent, or Firm*—Baker & McKenzie

[57] ABSTRACT

A high lift tag axle load transfer system which can be used with front or rear discharge mixers, and front or rear mounted engines, and which includes raise, lower, and load cylinders carried on the outside of the main truck frame.

11 Claims, 11 Drawing Figures fig.7.

HIGH LIFT TAG AXLE LOAD TRANSFER SYSTEM

This application relates generally to truck load transfer systems, and specifically to a tag axle high lift system for heavy duty truck vehicles, such as transit concrete mixers, which can be raised, lowered, and loaded at will by an operator in a front mounted cab.

As is well known, the use of some type of an auxiliary load carrying axle which can be selectively operated to lengthen or decrease the effective wheel span of such a vehicle is made necessary by State weight laws pertaining to the maximum weight per unit of length which can travel on State highways, the so-called "bridge formula" States.

Tag axle systems for transit concrete mixers are broadly known in the art as exemplified by U.S. Pat. Nos. 3,112,100 and 3,191,961. Often such systems include a lifting mechanism, concrete mixer fill hoppers, concrete mixer discharge chutes and an auxiliary frame structure which, of necessity, must be of heavy duty construction and extend a substantial rearwardly direction of the main truck frame due to spacing and stress requirements inherent in the design of such structures.

However, all prior art systems known to applicants have one or more serious drawbacks, such as (with respect to concrete mixer body mounted pivot type axle structures) a rather long span between the mounting pivot on the concrete mixer body and the tag axle center, which results in high stress loads within the system due to its length.

Further, many prior systems have utilized a single hydraulic cylinder to derive the susposed advantages of simplicity and cost but which inevitably resulted in a construction in which (i) only minimal space has remained available for the truck components such as engine, transmission axles, etc., (ii) restricted load carrying space, (iii) exposure to damage resulting from normal use of such a unit, (iv) substantial spacing between the hydraulic mechanism on the concrete mixer body and truck frame (which results in substantial bending moments and therefore requires heavy construction to safely accommodate the hydraulically induced bending moments and forces), (v) restricting to front engine power systems, and (vi) narrow track axles with their resultant marginal side stability.

The system of this invention, by contrast, possesses none of the above-mentioned disadvantages; to the contrary, it possesses the following advantages.

The payload of a heavy duty truck vehicle having the truck mounted load transfer system of this invention is substantially increased over a prior system having the same maximum wheel span because of the "compressed" construction of the load transfer system of this invention as contrasted to prior systems. As one example, a prior system which included a span of about 87 inches to 92 inches between the lateral pivot center and the fourth axle center can be replaced by a system of the invention having a span of less then about 40 inches without losing any of the advantages of the prior construction; indeed, advantageous features not possessed by the prior systems are made possible by the use of the system of this invention as will become apparent from the following description.

Further the load transfer system of this invention provides maximum space between the truck frame members for accommodation of the essential truck components, such as the engine, transmission axles, etc., because the hydraulic cylinder means of this invention are mounted outside the truck frame members whereas prior practical load transfer systems almost invariably included a single hydraulic cylinder mounted within the truck frame profile which eliminated the use of much of said space.

In addition the load transfer system of this invention enables the truck body to be mounted directly to the truck frame which utilizes the full legal width of the truck for load carrying purposes due, among other reasons, to the mounting of the hydraulic cylinder means below the top of the truck frame, as contrasted to prior constructions in which the hydraulic cylinder means are mounted above the top of the truck frame.

Yet a further advantage of the load transfer system of this invention is the protection from normal wear and tear to which such units are subjected resulting from the mounting of the hydraulic cylinder means in a protected position on the truck frame as contrasted to prior systems in which the hydraulic cylinder means are mounted in an exposed position at the rear and top of the truck frame.

A further advantage of the load transfer sytem of this invention is the smaller (by comparison) bending moments and structural materials required to accommodate the hydraulic cylinder forces due to the near minimum spacing between the hydraulic cylinder means centerline and the outer vertical surface of the frame rail. In prior constructions, the spacing varied from a substantially greater space to a maximum (represented by location of the hydraulic cylinder means at the midpoint of the span of the truck frame), and as a consequence required increase in the structural size and strength of materials to accommodate the resultant large bending moments.

A further advantage of the load transfer system of this invention is the ability to adapt such a system to either a front or rear mounted engine vehicle. Prior art load transfer systems were almost invariably limited to front engine power vehicles.

Yet an additional advantage of one embodiment of the invention is the ability to use a number of standard, readily available components, such as a standard axle, thereby substantially lowering the cost, as compared to a prior construction of comparable capacity.

Yet a further advantage of one embodiment of the load transfer system of this invention is the ability to provide maximum safety and side stability to the resultant construction due to the use of a conventional wide track axle, as contrasted to prior constructions which utilize narrow track axles having marginal side stability and lower safety factors.

Other objects, features, and advantages of the invention will be apparent from a reading of the following exemplary disclosure thereof.

The invention is illustrated more or less diagrammatically in the accompanying drawing wherein.

Like reference numerals will be used to refer to like parts and features from Figure to Figure in the drawing.

Figure 1:
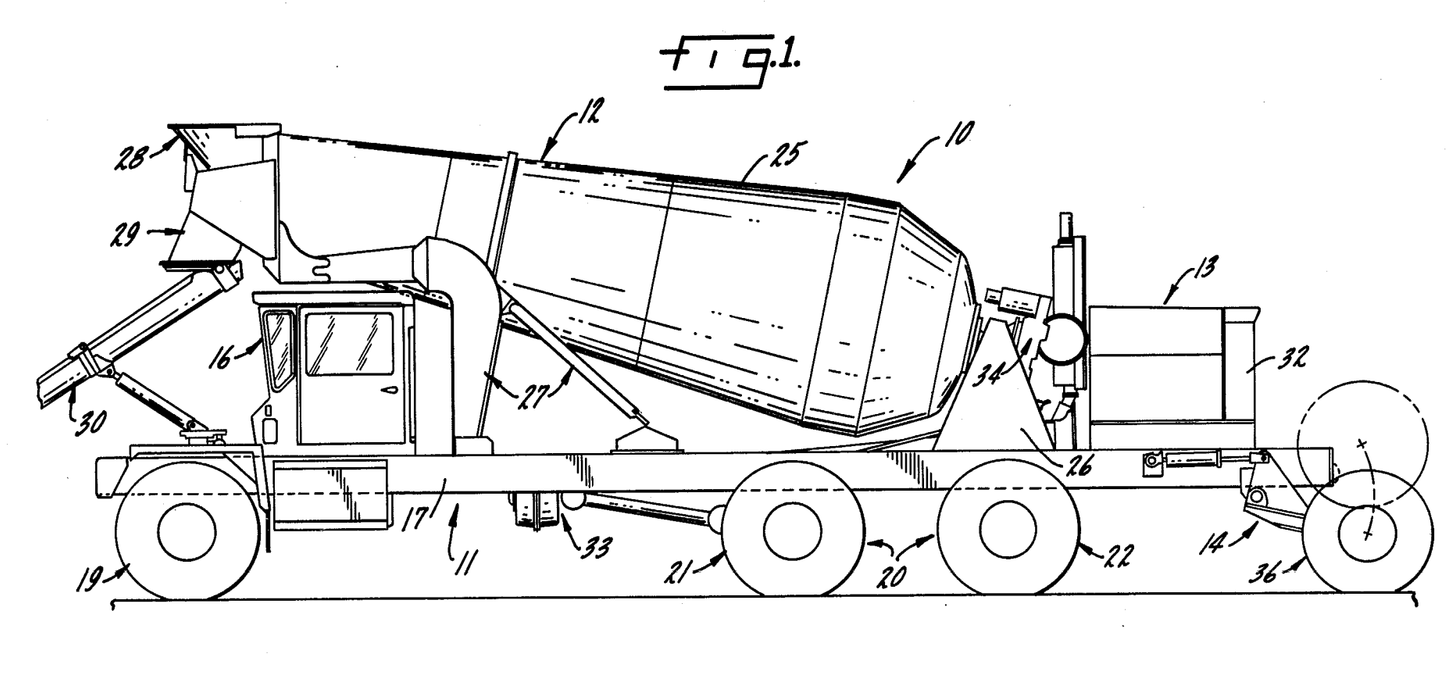
FIG. 1 is an elevation of the high lift tag axle as applied to a transit concrete mixer of this invention.

Referring first to the embodiment of FIGS. 1-8, and specifically to FIG. 1, a forward discharging transit concrete mixer is indicated generally at 10. It will be understood that, although a forward discharging mixer has been shown for purposes of illustration, the invention is equally adaptable to rear discharging transit concrete mixers.

The transit concrete mixer includes a truck frame, indicated generally at 11, a concrete mixer assembly, indicated generally at 12, a power plant, indicated generally at 13, and a high lift tag axle mechanism, indicated generally at 14. As will be immediately apparent from FIG. 1, the high lift tag axle mechanism 14 is a component of the truck frame 11, and not a separate, auxiliary trailing mechanism, or part of a concrete mixer body assembly.

Truck frame 11 includes a front mounted cab assembly, indicated generally at 16, a pair of duplicate side rail members, one of which is indicated at 17, forward steerable wheel means, indicated generally at 19 and first rear wheel means mounted on the truck frame indicated generally at 20. The first rear wheel means consists of a pair of tandem axle assemblies 21, 22.

The mixer assembly 12 includes a mixer drum 25 which is supported, at its rearward end, by conventional mounting structure 26 which in turn is carried by the truck frame, and, at the forward end, by front mounting structure which is indicated generally at 27.

Conventional loading mechanism, indicated generally at 28 is carried by the upper, smaller diameter end of the mixer drum for the reception of aggregate and other materials used in the preparation of a batch of concrete. Discharge mechanism is indicated generally at 29, the mechanism including a discharge guide chute assembly indicated generally at 30 whose position, in this embodiment, can be controlled by the driver in the cab without leaving the cab.

The power plant 13 includes an engine 32 which drives the transit mixer 10 via the tandem axle assemblies 21 and 22 through a conventional power train, a component of which is indicated generally at 33. The engine powers the mixer assembly through a drive train indicated generally at 34. It will be understood that the power plant, including the wheel drive system and the transit mixer drive system do not, of themselves, form a unique portion of the invention illustrated herein, and accordingly a more specific description is not required.

The high lift tag axle mechanism includes a pair of wheel assemblies, one of which is indicated at 36, which is adapted to be raised, lowered, and loaded by appropriate mechanism. Since the wheel assemblies are identical, one to the other, and are linked by a common shaft, illustrated at best FIG. 3, a description of one will suffice for a description of both.

Figure 2:
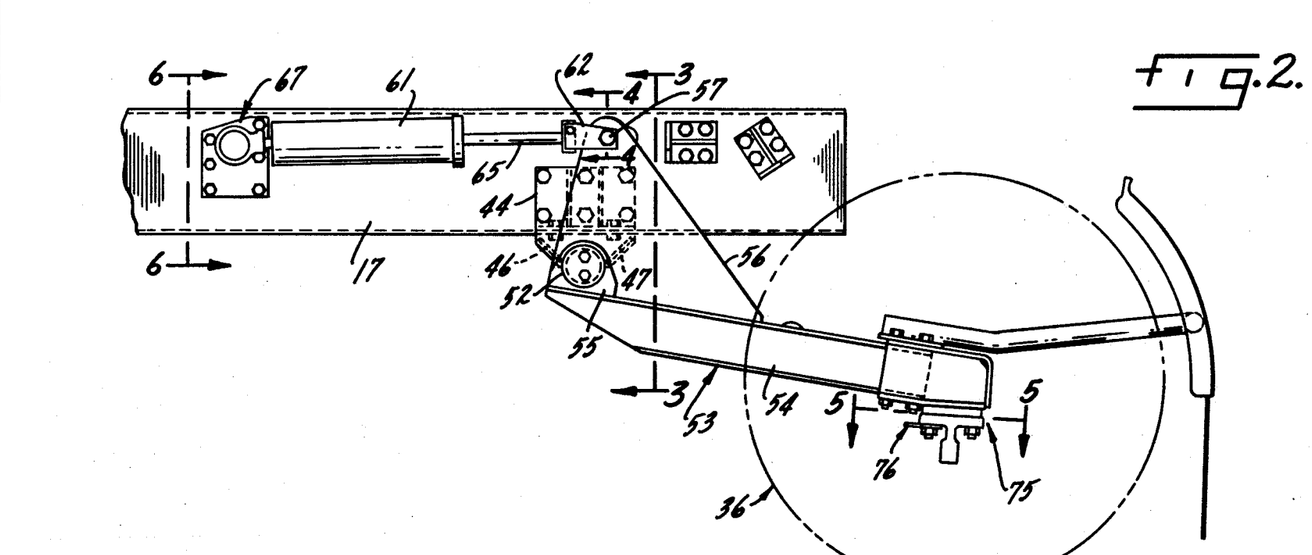
FIG. 2 is an elevation of the high lift tag axle portion of the transit concrete mixer of FIG. 1 taken to an enlarged scale as compared to FIG. 1.
Figures 3, 4, 5:
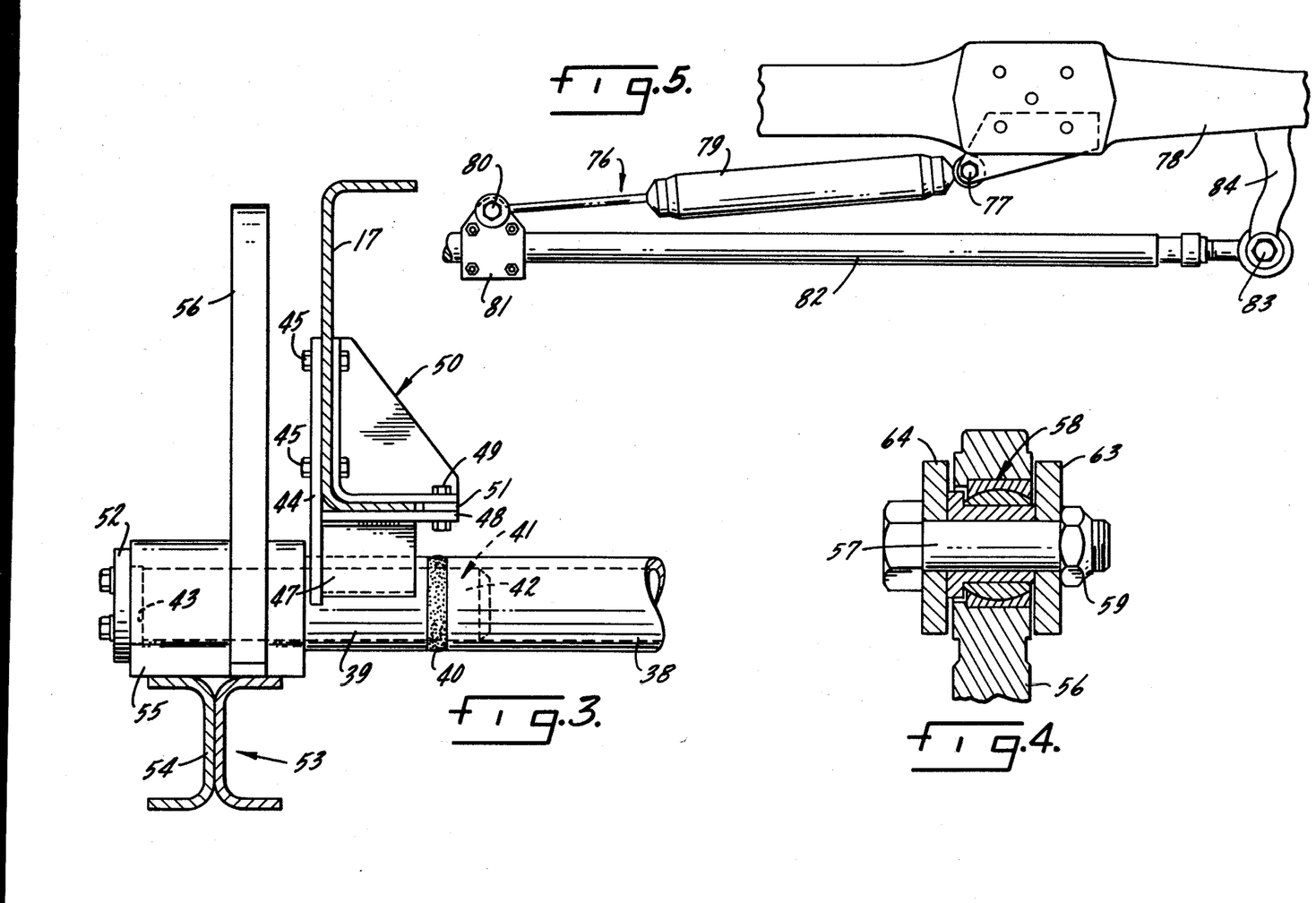
FIG. 3 is a view taken substantially along the line 3—3 of FIG. 2.
FIG. 4 is a view taken substantially along the line 4—4 of FIG. 2.
FIG. 5 is a view taken substantially along the line 5—5 of FIG. 2.

Referring now to FIGS. 1-3, and FIGS. 1 and 2 specifically, it will be noted that the high lift tag axle mechanism includes a rigid spacer tube 38 which is located horizontally and transversely with respect to the longitudinal axis of the transit concrete mixer 10. Since the construction and mounting of the wheel assemblies are identical, only wheel assembly 36, which is associated with the left side rail member 17, will be described in detail.

Spacer tube 38 is connected to a sleeve 39 by weld material 40, or any other suitable means whereby relative rotation between spacer tube 38 and sleeve 39 may be precluded. A stub shaft is indicated at 41, the right end 42 of the stub shaft being received within the left end of spacer tube 38, and the left end 43 projecting outwardly a substantial distance beyond the left side rail member 17 as clearly illustrated in FIG. 3. Weld material 40 also secures the stub shaft 41 to spacer tube 38 and sleeve 39 whereby the three components form a rigid unitary unit.

The stub shaft unit just described is rigidly secured to left side rail member 17 by trunnion plate 44 which is secured to the left side rail member 17 by, in this instance, bolts 45, and to sleeve 39 by welding or other suitable means. A pair of brace plates are indicated at 46 and 47. The lower end of each brace plate is welded to the sleeve 39, and the outside edge, viewed with respect to the longitudinal axis of the transit concrete mixer as the center of the unit, is welded to the backside of trunnion plate 44. The upper end of each base plate is welded to a base plate 48 whose left end in turn is welded or otherwise suitably secured to the inside surface of trunnion plate 44. Base plate 48 is made fast to left side rail member 17 by a plurality of bolts 49 which connect a bracket assembly 50 to the base plate 48 through a spacer 51. As best seen in FIG. 3, trunnion plate 44, base plate 48, and bracket assembly 50 in effect clamp the pivot stub shaft 42 and its associated structure to left side rail member 17 by removeable bolts 45 whereby the entire structure illustrated in FIG. 3 can be removed from the left side rail member 17 by merely unscrewing the plurality of bolts associated with each of the side rail members.

After sleeve 39 is slid onto stub shaft 41, end cap 52 is secured to the outer end of the stub shaft by bolts or any other suitable means which will ensure that sleeve 39 remains fixed against transverse movement along the stub shaft.

The pivotable portion of the tag axle mechanism includes a generally L-shaped beam assembly, indicated generally at 53, which is connected, at its left or forward end, to hydraulic raising, lowering and loading mechanism, and, at its rear or right end, to wheel assembly 36.

The beam assembly 53 includes a beam 54 which, in this instance, consists of a pair of generally U-shaped beams which are secured back to back as best illustrated in FIG. 3.

A bearing block 55 is secured, as by welding or any other suitable means, to the left end of beam 53 as best seen in FIG. 2. A generally triangularly shaped pivot arm is indicated at 56, the pivot arm being welded along its lower edge to the upper surface of beam 54 and, at its left end, to the bearing block 55. The upper end of the pivot arm is apertured to receive a connecting pin 57 which is rotatable with respect to the pivot arm, but constrained against transverse movement, as by the structure illustrated best in FIG. 4.

Referring to FIG. 4, it will be noted that the pivot pin 57 is supported in a conventional spherical bearing assembly 58 and is precluded from longitudinal movement by the abutments formed by the head of the bolt and fastener 59.

Pivot pin 57 connects the beam assembly 53 to hydraulic cylinder 61 by means of a generally U-shaped clevis indicated at 62, whose arms 63, 64 are spaced to receive pivot arm 56 and apertured to receive pivot pin 57. The clevis 62 in turn is connected to piston rod 65 of hydraulic cylinder 61. The cylinder is mounted for pivotable movement with respect to rail side member 17 by the structure shown best in FIG. 6.

Figure 6:
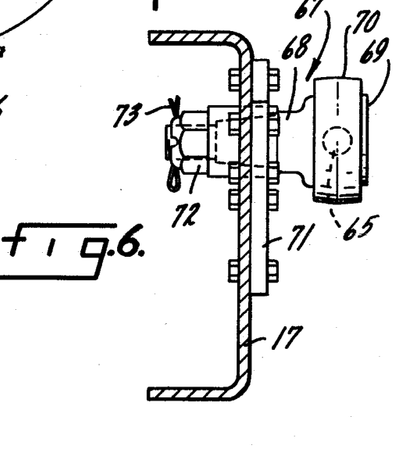
FIG. 6 is a view taken substantially along the line 6—6 of FIG. 2.

In FIG. 6 a ball stud assembly is indicated generally at 67, which assembly includes a stationary shaft 68 having an expanded head 69 about which ring 70 of the cylinder assembly is received. The stationary shaft is carried by a mounting plate 71 which is bolted to left side rail member 17. Rotation of the shaft 68 is precluded by the castle nut 72 and cotter pin 73 so that the ball stud assembly 67 provides a base about which hydraulic cylinder mechanism 61 can pivot as the piston rod 65 is extended and retracted.

The right end of beam 54 carries an axle assembly, indicated generally at 75, which carries, at its outer end, wheel assembly 36 which includes a conventional rubber tire.

The axle assembly includes a stabilizer assembly, illustrated best in FIGS. 2 and 5.

The stabilizer assembly 76 includes a hydraulic cylinder which is pivoted, at its inner end as at 77, to the axle beam 78 which forms a part of the axle assembly 75. The other end of stabilizer 79 is connected, as at 80, to a bracket 81 which in turn is fastened to a steering link 82 which in turn is pivotally connected, as at 83, to an extension arm 84 which in turn is connected to wheel assembly 36.

Figure 7:
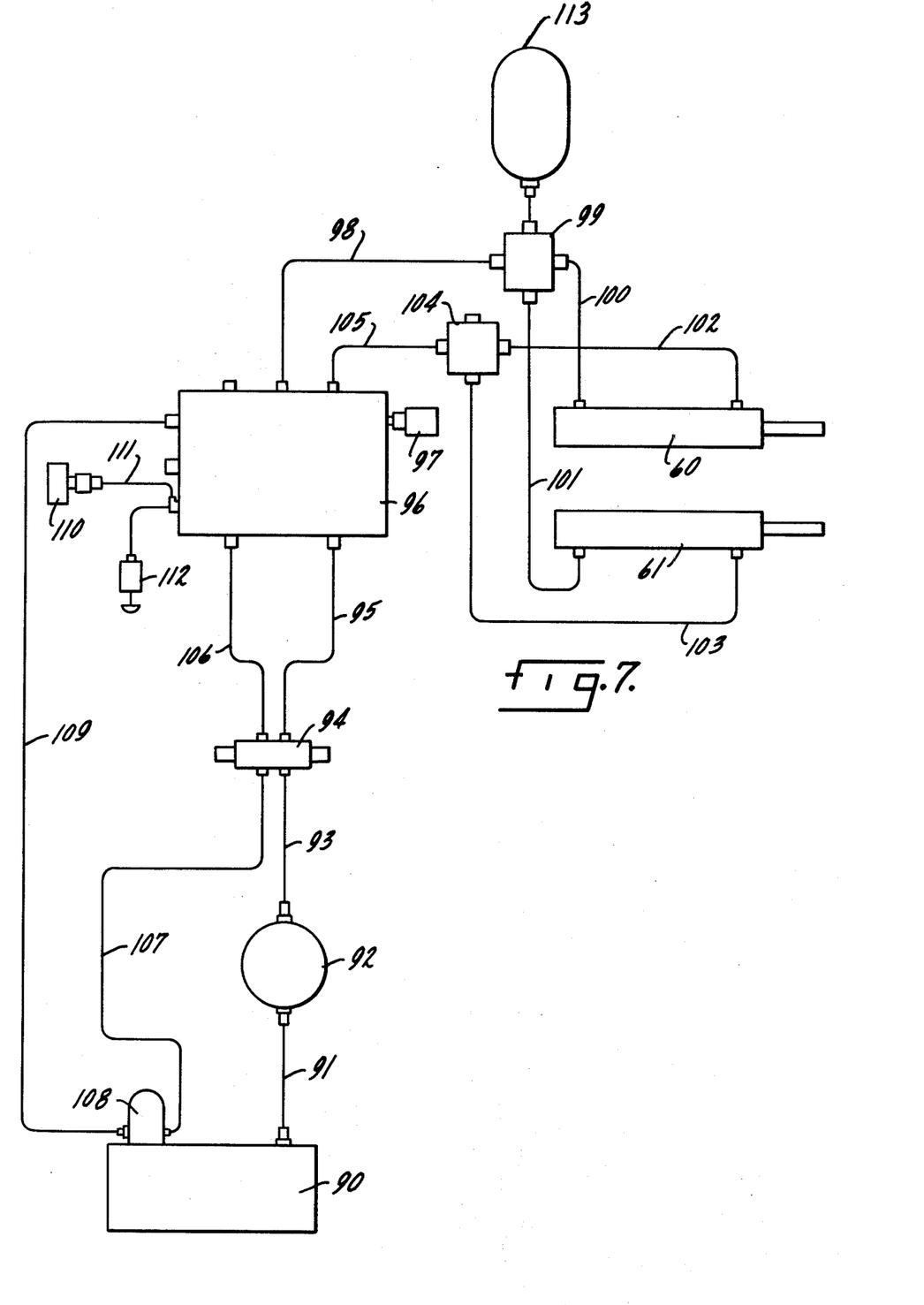
FIG. 7 is a schematic illustration of the hydraulic system of the transit concrete mixer of FIG. 1.

A hydraulic circuit for raising, lowering, and loading the high lift tag axle is illustrated in FIG. 7.

The assembly includes a reservoir 90 which is connected by a hydraulic line 91 to a pump 92. Outlet line 93 connects pump 92 to a cylinder control valve 94. Hydraulic line 95 connects the cylinder control valve 94 to a valve module 96. A fixed pressure raise pressure switch associated with the valve module is indicated at 97.

High pressure line 98 connects the valve module 96 to manifold 99. Manifold 99 has three outlet lines, 100, 101, and accumulator 113. Lines 100 and 101 function as high pressure fluid inlet lines to the hydraulic cylinder 61, 60. A pair of outlet lines are indicated at 102, 103, said lines connecting the end of hydraulic cylinder 60 and 61 ahead of the pistons to a second manifold 104. Line 105 connects manifold 104 to the valve module 96. Fluid flow across valve module 96 passes through line 106, through cylinder control valve 94, through line 107 to filter 108 and thence to reservoir 90.

A by-pass line 109 connects the valve module 96 directly with reservoir 90. A gauge 110 is connected to valve module 96 by line 111, the gauge being connected into the same terminal of the valve module as is adjustable pressure switch 112 so that the pressure established on switch 112 can be read on gauge 110 at a convenient location.

Figure 8:
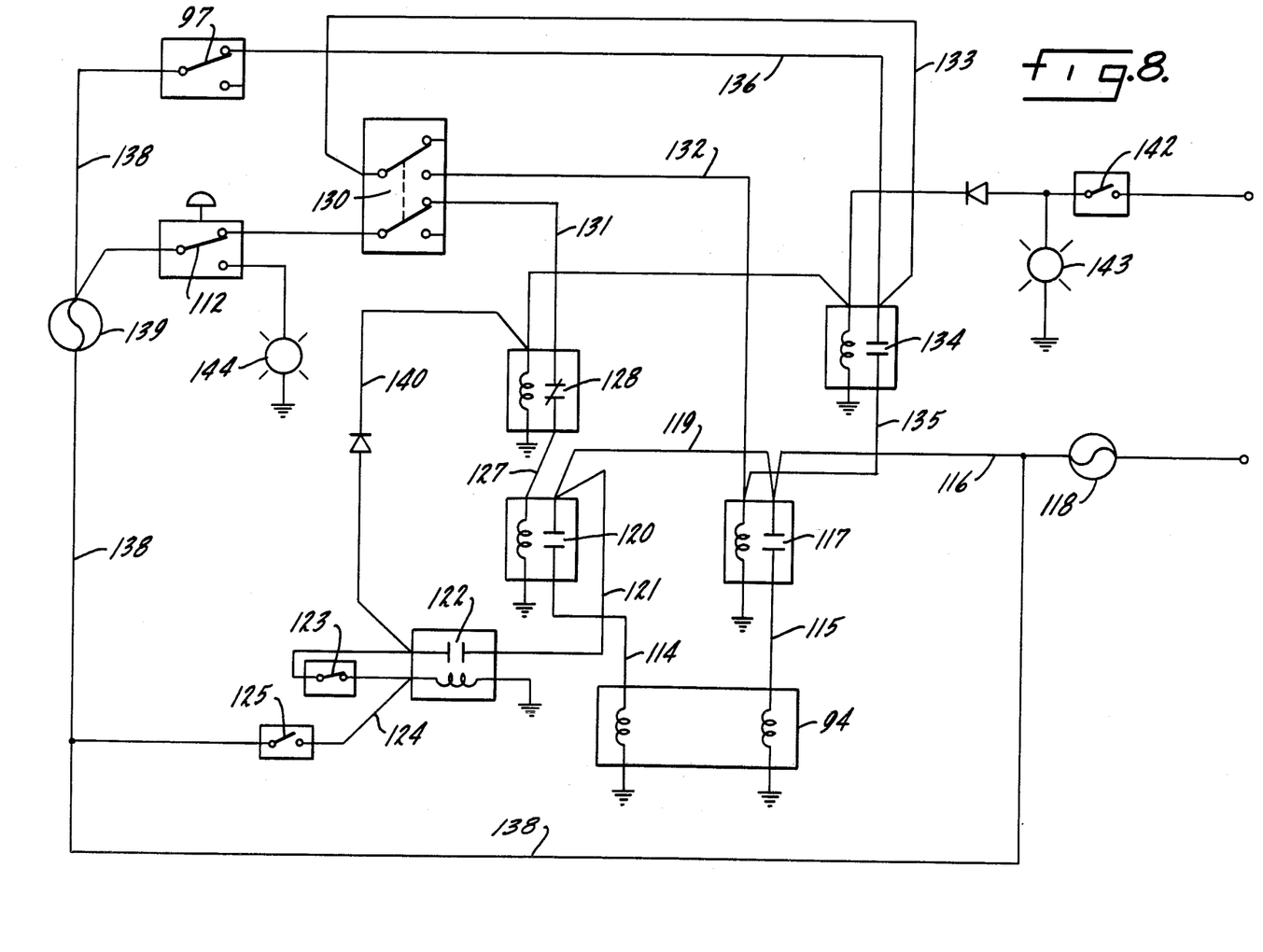
FIG. 8 is a schematic illustration of the electrical circuit of the transit concrete mixer of FIG. 1.

A schematic electrical circuit for the embodiment of FIGS. 1-8 is illustrated in FIG. 8. The circuit includes lines 114, 115, which actuate solenoid controlled plungers in the 4-way hydraulic control valve 94.

A line 116 connects normally open relay 117 to an automatic reset circuit breaker which is 118. Line 119 connects normally open contact 117 to normally open contact 120. Line 121 connects normally open contact 122 to contact 120. A reset toggle switch is indicated at 123, and a line 124 from normally open contact 122 connects the mixer discharge switch 125 to the coil of the normally open contact 122.

Line 127 connects normally closed contact 128 to the coil of contact 120. A switch 130, which may be located in the cab 16, is connected to contacts 128 and the coil of 117 by lines 131 and 132. The upper switch of double switch 130 is connected by line 133 to normally open contact 134, which in turn is connected by line 135 to the coil of contact 117. Another line 136 connects contact 134 to the raise pressure switch 97. The other side of switch 97 is connected by line 138 to the automatic reset switch 118 through a second automatic reset circuit breaker 139. Contact 122 is connected by line 140 to the coil of normally closed contact 128.

A back-up light switch and back-up light are indicated at 142, 143 respectively and an axle load light located in cab 16 is indicated at 144.

Figure 9:
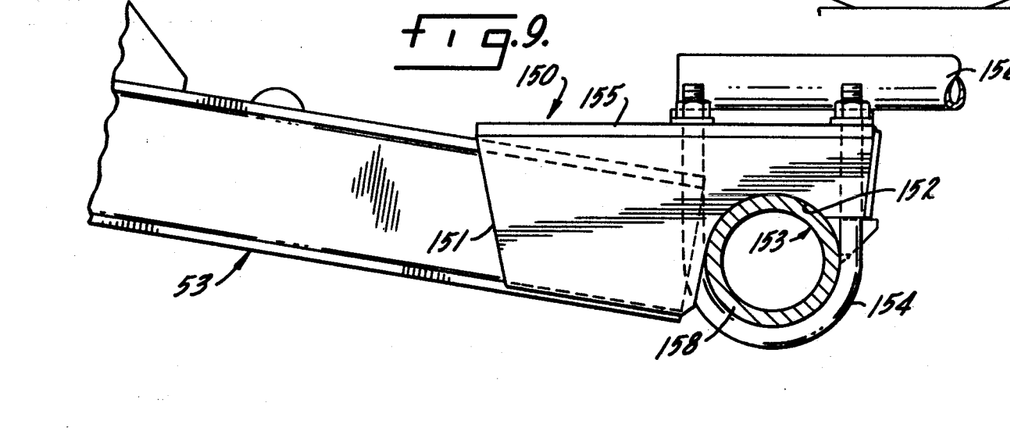
FIG. 9 is an elevation of an alternate form of the high lift tag axle portion of the transit concrete mixer of this invention.
Figure 10:
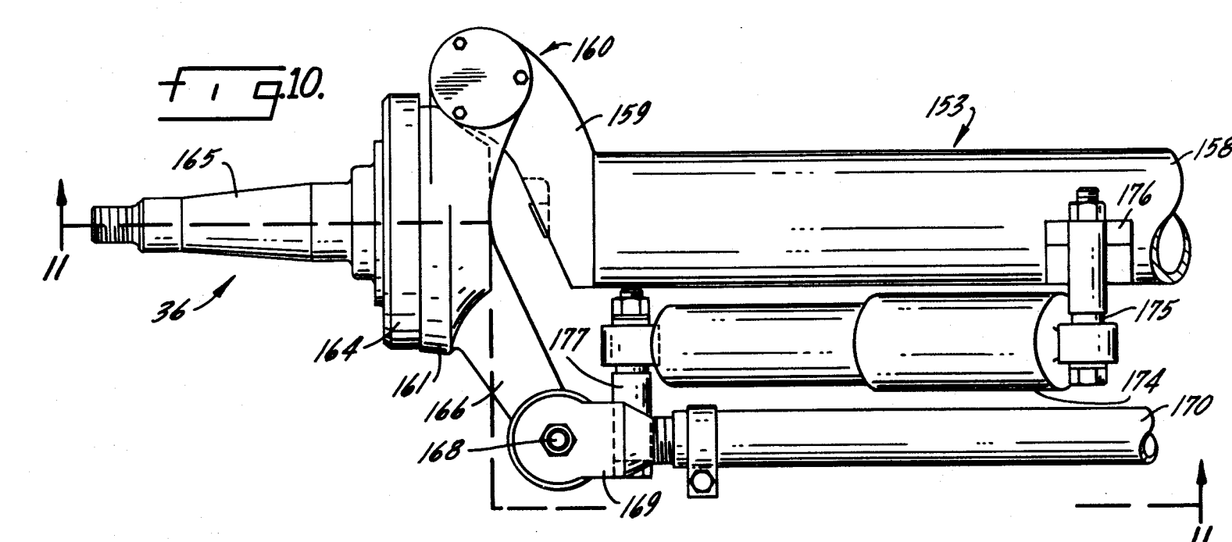
FIG. 10 is a top plan view of a portion of the wheel suspension system of the embodiment of FIG. 9.
Figure 11:
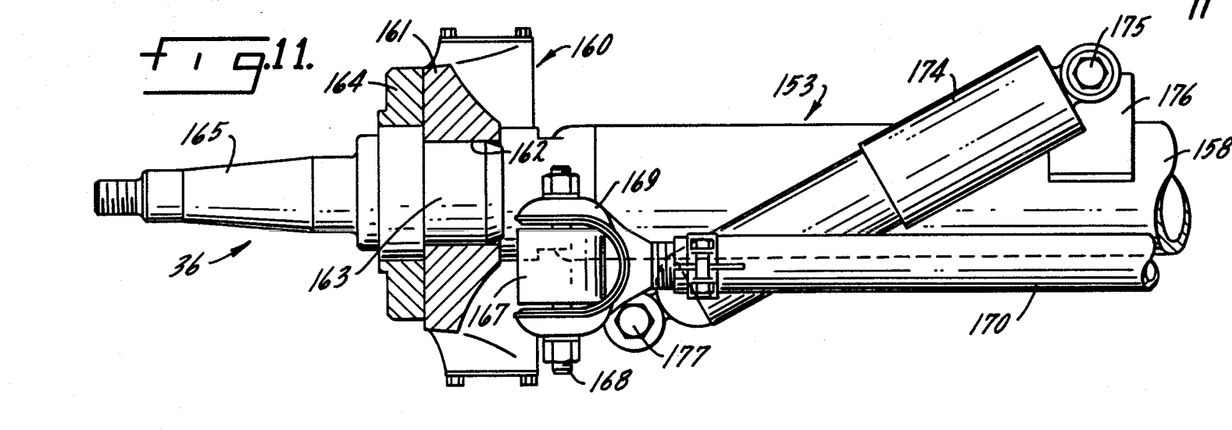
FIG. 11 is a view taken substantially along the line 11—11 of FIG. 10.

An alternate embodiment in which the caster steering principle is used in the self-steering fourth axle, which consists of the wheel assemblies 36, is illustrated in FIGS. 9, 10 and 11.

Referring first to FIG. 9 it will be noted that the beam assembly 53 terminates in a bracket assembly 150 which is welded or otherwise suitably secured to the beam assembly 53. The bracket assembly 150 includes a pair of generally rearwardly projecting side plates, one of which is indicated at 151 whose rearward underside is cut away, as at 152 to receive axle assembly 153. The axle assembly 153 is secured to the bracket assembly 150, and thereby the beam arm assembly 53, by a plurality of U-bolts 154 whose upper, threaded ends are received in a top plate 155 which form the upper portion of the bracket assembly 150. Support structure is indicated at 156 projecting rearwardly for the purpose of supporting a conventional fender assembly and tail light, none of which, of itself, forms an integral part of the invention and therefore is not illustrated.

Axle assembly 153 includes a tubular member 158 which is welded or otherwise suitably secured at its left end to a king pin arm 159 which, in turn, carries a king pin assembly 160. The king pin assembly 160 includes a flange 161 which has a central bore 162 of a size to receive the spindle end 163 for wheel assembly 36. Preferably, spindle end 163 is press fitted into the king pin assembly flange 161. An additional flange 164 is placed over the expanded diameter portion of the axle spindle 165 and, preferably, welded or otherwise suitably secured to king pin assembly flange 161 to provide adequate support for the wheel and brake assembly.

A rearwardly extending link is indicated at 166, the link terminating in a boss 167 through which passes a vertical pin 168. The pin connects yoke 169 of tie rod 170 to the wheel assembly 36. Thus, as wheel assembly 36 moves clockwise about a vertical axis as viewed in FIG. 10 about king pin 160 as a pivot axis, link 166 will cause tie rod 170 to move in a leftward direction. Since the right end of tie rod 170 is connected to a similar link 166 on the right wheel assembly, the wheel assemblies will thereby be moved in approximate parallelism.

Structure for preventing wheel shimmy includes a pair of hydraulic shock absorbers, one of which is indicated at 174. One end of the shock absorber is connected, by pin 175, to a bracket 176 which is fastened to tube 158.

The other end of the shock absorber 174 is connected by pin 177 to the yoke section 169 of tie rod 170.

From the foregoing description the mode of operation is readily apparent.

When the truck operator wishes to increase the effective load span of the unit, the electric circuit of FIG. 8 is actuated to lower the wheel assembly 36 from a raised position to a lowered position, and thereafter impose load on the wheel assembly in contact with the ground.

Conversely when it is desired to raise the wheel assembly, as when the unit reaches a job site and is to be discharged, or a supply station and is to be charged, or when shifting the concrete transit mixer transmission into reverse with the wheel assembly in the lowered position, actuation of the electric and hydraulic controls will retract the piston rods of hydraulic cylinder assemblies 61 and swing the wheel assembly away from the ground about stub shaft 42.

The operation of the hydraulic circuit of FIG. 7 and electric circuit of FIG. 8 is as follows:

1. With the tag axle mechanism in the raised position the operator resets toggle switch 123 and sets adjustable pressure switch 112 to obtain required ground load.

2. Switch 130 is actuated to lower position which supplies electric current to line 131, feeds through normally closed relay 128, energizes line 127 and closes normally open relay 120. Lines 116 and 119 supply current to closed relay 120 which supplies current to line 114 which opens four way hydraulic valve 94 to line 95. Hydraulic fluid from reservoir 90 through line 91 is pressurized by pump 92, supplied under pressure through line 93 to open four way valve 94. Hydraulic fluid under pressure is supplied through line 95 through vavle module 96 to line 98 through manifold 99 to lines 100 and 101 and then to the piston end of cylinders 60 and 61. Cylinders 60 and 61 extend their respective cylinder rods to lower the tag axle mechanism. A hydraulic accumulator 113 is attached to manifold 99 to absorb road shock transmitted back to the hydraulic system from the high lift tag axle mechanism. When the tag axle mechanism contacts the ground the system hydraulic pressure builds up at valve module 96 to equalize the pressure setting of pressure switch 112. When the pressure at switch 112 reaches the operator selected pressure, switch 112 opens and interrupts the supply of electrical current to line 131 and four way valve 94 and closes valve 94 to line 95, which maintains the hydraulic pressure at the level selected by the operator at switch 112. When switch 112 opens and closes valve 94 to line 95, valve 94 is opened to line 107 which permits hydraulic fluid from pump 92 to line 93 to return through line 107 filter 108 to reservoir 90 at atmospheric pressure. When switch 112 opens to interrupt electric current to four way valve 94 a second circuit in switch 112 closes to illuminate axle load light 144 in cab 16 to indicate that the tag axle mechanism has been loaded to the level selected in item 1.

3. As the cylinder rods of cylinders 60 and 61 extend the hydraulic oil on the rod end of the cylinders is transferred at atmospheric pressure to lines 102 and 103 to manifold 104 through line 105 through valve module 96 through line 109 through filter 108 and returns to reservoir 90 at atmospheric pressure.

4. When the tag axle mechanism is in the lowered position, with hydraulic pressure at the level selected at adjustable pressure switch 112, and four way valve 94 closed to line 95, slight leakage may occur in the closed hydraulic system. The hydraulic pressure may be reduced to a level below that selected by the operator at pressure switch 112. When this occurs the cycle described in item 2 repeats itself to maintain the hydraulic pressure and ground load on the tag axle mechanism as selected in item 1.

5. When the operator wishes to raise the tag axle mechanism from the cab 16, switch 130 is actuated to the raise position. Switch 130 in the raise position interrupts electric current to line 131 and valve 94 which closes line 95. Switch 130 also provides electric current to line 132 and to normally open relay 117 to close relay 117. Electric current then passes through closed relay 117 from line 116 to line 115 to four way valve 94 which opens four way valve 94 to line 106. Hydraulic fluid from reservoir 90 through line 91 is pressurized by pump 92, supplied under pressure through four way valve 94 to line 106. Hydraulic fluid pressure is supplied through line 106 through valve module 96 to line 105 through manifold 104 to lines 102 and 103 and then to the cylinder rod end of cylinders 60 and 61. Cylinders 60 and 61 retract their respective cylinder rods to raise the tag axle mechanism. When the tag axle mechanism is raised to the maximum height, against predetermined stops, the hydraulic pressure builds up at valve module 96 to equalize the fixed pressure setting of normally closed raise pressure switch 97. Pressure switch 97 then opens and interrupts the supply of electrical current to lines 136, 132 and four way valve 94, and closes valve 94 to line 106 to maintain the hydraulic pressure at the level controlled by raise pressure switch 97. When switch 97 opens, and closes valve 94 to line 106, valve 94 is opened to line 107 which permits hydraulic fluid from pump 92 and line 93 to return through line 107 and filter 108 to reservoir 90 at atmospheric pressure.

6. As the cylinder rods of cylinders 60 and 61 retract, the hydraulic oil on the piston end of the cylinders is transferred at atmospheric pressure to lines 100 and 101 to manifold 99 through line 98 through valve module 96 through line 109 through filter 108 and returns to reservoir 90 at atmospheric pressure.

7. When the tag axle mechanism is in the raised position, with hydraulic pressure at the level established at raise pressure switch 97, and four way valve 94 is closed to line 106, slight leakage may occur in the closed hydraulic system. The hydraulic pressure may be reduced to a level below that established by pressure switch 97. When this occurs the cycle described in item 5 repeats itself to maintain the raise hydraulic pressure on the tag axle mechanism as established by raise pressure switch 97.

8. The tag axle mechanism, when lowered to the ground, will automatically raise when the operator shifts the transit concrete mixer transmission into reverse gear. When shifting the transmission into reverse gear back-up light switch 142 closes and provides electrical current to illuminate back-up light 143 and opens normally closed relay 128 which interrupts electric current to four way valve 94 which closes line 95. Back up light switch 142 when closed also closes normally open relay 134, which then supplies electrical current through line 135, which closes normally open relay 117.

Electric current then passes through closed relay 117 from line 116 to line 115 to four way valve 94 which opens four way valve 94 to line 106. Hydraulic fluid from reservoir 90 through line 91 is pressurized by pump 92, supplied under pressure through line 93 through four way valve 94 to line 106. Hydraulic fluid under pressure is supplied through line 106 through valve module 96 to line 105 through manifold 104 to lines 102 and 103 and then to the cylinder rod end of cylinders 60 and 61. Cylinders 60 and 61 retract their respective cylinder rods to raise the tag axle mechanism. When the tag axle mechanism is raised to the maximum height, against predetermined stops, the hydraulic pressure builds up at valve module 96 to equalize the fixed pressure setting of normally closed raise pressure switch 97. Pressure switch 97 then opens and interrupts the supply of electrical current to lines 136, 132 and four way valve 94 and closes valve 94 to line 106 to maintain the hydraulic pressure at the level controlled by raise pressure switch 97. When switch 97 opens, and closes valve 94 to line 106, valve 94 is opened to line 107 which permits hydraulic fluid from pump 92 and line 93 to return through line 107 and filter 108 to reservoir 90 at atmospheric pressure. As the cylinder rods of cylinders 60 and 61 retract the hydraulic oil on the piston end of the cylinders is transferred at atmospheric pressure to lines 100 and 101 to manifold 99 through line 98 through valve module 96 through line 109 through filter 108 and returns to reservoir 90 at atmospheric pressure.

9. When the operator shifts the transit concrete mixer out of reverse gear the back up light switch 142 will open and interrupt the supply of electrical current to shut off the back-up light 143 and permits normally closed relay 128 to close and supply electrical current to four way valve 94 which opens to line 95. Back-up light switch 142 when open also permits normally open relay 134 to open which then interrupts electrical current through line 135 which then permits normally open relay 117 to open. When relay 117 is open electric current to line 115 is interrupted which interrupts electric current to four way valve 94 which closes to line 106. Switch 130 which remained actuated to the lower position resumes the supply of electric current to relay 128 through line 131. Relay 128 energizes line 127 and closes normally open relay 120. Lines 116 and 119 supply current to closed relay 120 which supplies current to line 114 which opens four way hydraulic valve 94 to line 95. Hydraulic fluid from reservoir 90 through line 91 is pressurized by pump 92, supplied under pressure through line 93 to open four way valve 94. Hydraulic fluid under pressure is supplied through line 95 through valve module 96 to line 98. Through manifold 99 to lines 100 and 101 and then to the piston end of cylinders 60 and 61. Cylinders 60 and 61 extend their respective cylinder rods to lower the tag axle mechanism. A hydraulic accumulator 113 is attached to manifold 99 to absorb road shock transmitted back to the hydraulic system from the high lift tag axle mechanism. When the tag axle mechanism contacts the ground the system hydraulic pressure builds up at valve module 96 to equalize the pressure setting of pressure switch 112. When the pressure at which 112 reaches the operator selected pressure, switch 112 opens and interrupts the supply of electrical current to line 131 and four way valve 94 and closes valve 94 to line 95, which maintains the hydraulic pressure at the level selected by the operator at switch 112. When switch 112 opens and closes valve 94 to line 95, valve 94 is opened to line 107 which permits hydraulic fluid from pump 92 and line 93 to return through line 107 and filter 108 to reservoir 90 at atmospheric pressure. When switch 112 opens to interrupt electric current to four way valve 94 a second circuit in switch 112 closes to illuminate axle load light 144 in cab 16 to indicate that the tag axle mechanism has been loaded to the level selected in item 1. As the cylinder rods of cylinders 60 and 61 extend the hydraulic oil on the rod end of the cylinders is transferred at atmospheric pressure to lines 102 and 103 to manifold 104 through line 105 through valve module 96 through line 109 through filter 108 and returns to reservoir 90 at atmospheric pressure.

10. The tag axle mechanism, when lowered to the ground will automatically raise when the operator shifts the concrete mixer control to discharge. Mixer discharge switch no. 125 closes to supply electric current through line 124 to close normally open relay 122 and to supply electric current through line 124 to close normally open relay 122 and to supply electric current through reset toggle switch 123 through line 140 and to open normally closed relay 128. Opening relay 128 interrupts electric current to relay 120 which opens and interrupts the supply of electric current to line 114 which closes valve 94 to line 95. Line 140 also supplies electric current to normally open relay 134 which closes and takes electric current through normally closed pressure switch 97 and line 136 to supply electric current through line 135 to close normally open relay 117. Electric current then passes through closed relay 117 from line 116 to line 115 to four way valve 94 which opens four way valve 94 to line 106. Hydraulic fluid from reservoir 90 through line 91 is pressurized by pump 92, supplied under pressure through line 93 through four way valve 94 to line 106. Hydraulic fluid under pressure is supplied through line 106 through valve module 96 to line 105 through manifold 104 to lines 102 and 103 and then to the cylinder rod end of cylinders 60 and 61. Cylinders 60 and 61 retract their respective cylinder rods to raise the tag axle mechanism. When the tag axle mechanism is raised to the maximum height, against predetermined stops, the hydraulic pressure builds up at valve module 96 to equalize the fixed pressure setting of normally closed raise pressure switch 97. Pressure switch 97 then opens and interrupts the supply of electrical current to lines 136, 132 and four way valve 94 and closes valve 94 to line 106 to maintain the hydraulic pressure at the level controlled by raise pressure switch 97. When switch 97 opens, and closes valve 94 to line 106, valve 94 is opened to line 107 which permits hydraulic fluid from pump 92 and line 93 to return through line 107 and filter 108 to reservoir 90 at atmospheric pressure. As the cylinder rods of cylinders 60 and 61 retract the hydraulic oil on the piston end of the cylinders is transferred at atmospheric pressure to lines 100 and 101 to manifold 99 through line 98 through valve module 96 through line 109 through filter 108 and returns to reservoir 90 at atmospheric pressure.

11. The tag axle mechanism remains in the raised position when the operator shifts the mixer discharge control to neutral or charge after discharging the load. Mixer discharge switch 125 opens, however, relay 122 remains closed by electric current supplied through line 121, through closed relay 122 through reset toggle switch 123 to energize relay 122. Closed relay 122 supplies electric current to line 140 which opens normally closed relay 128. Opening relay 128 interrupts electric current to relay 120 which opens and interrupts the supply of electric current to line 114 which closes valve 94 to line 95. Line 140 also supplies electric current to normally open relay 134 which closes and takes electric current through normally closed pressure switch 97 and line 136 to supply electric current through line 135 to close normally open relay 117. Electric current then passes through closed relay 117 from line 116 to line 115 to four way valve 94 which opens four way valve 94 to line 106. Hydraulic fluid from reservoir 90 through line 91 is pressurized by pump 92, supplied under pressure through line 93 through four way valve 94 to line 106. Hydraulic fluid under pressure is supplied through line 106 through valve module 96 to line 105 through manifold 104 to lines 102 and 103 and then to the cylinder rod end of cylinders 60 and 61. Cylinders 60 and 61 retract their respective cylinder rods to raise the tag axle mechanism. When the tag axle mechanism is raised to the maximum height, against predetermined stops, the hydraulic pressure builds up at valve module 96 to equalize the fixed pressure setting of normally closed raise pressure switch 97. Pressure switch 97 then opens and interrupts the supply of electrical current to lines 136, 132 and four way valve 94 and closes valvve 94 to line 106 to maintain the hydraulic pressure at the level controlled by raise pressure switch 97. When switch 97 opens, and closes valve 94 to line 106, valve 94 is opened to line 107 which permits hydraulic fluid from pump 92 and line 93 to return through line 107 and filter 108 to reservoir 90 at atmospheric pressure.

Although a preferred and alternate embodiment of the invention has been illustrated and described, it will at once be apparent to those skilled in the art that other modifications may be made within the scope of the invention.

Accordingly, it is intended that the scope of the invention be limited solely by the scope of the hereafter appended claims when interpreted in light of the pertinent prior art, and not by the specific examples hereinbefore described.

We claim:

1. In a transit concrete mixer, the combination of
a truck frame,
forward steerable wheel means mounted on the truck frame,
first rear wheel means mounted on the truck frame,
a concrete mixer mounted on the truck frame, and
means for transferring load away from the first rear wheel means, or the first rear wheel means and the forward steerable wheel means, and thereby increasing the load span of said transit concrete mixer whether rear or front discharging,
said load transfer means including a load transfer system having
second rear wheel means rearwardly of said first means, said second rear wheel means being pivotally mounted to the truck frame by
pivot means carried by the truck frame and generally transversely horizontally axially disposed with respect to the longitudinal axis of the truck frame, and
a pair of hydraulic cylinder means pivotally mounted on the truck frame, one on each side thereof the pivot point between the truck frame and each one of said pair of hydraulic cylinder means being located beneath the top of the truck frame,
said second rear wheel means including two individual portions, one on each side of the truck frame
the reciprocating end of each one of said pair of hydraulic cylinder means being connected to its associated portion of the second rear wheel means so as to pivot said second rear wheel means about its pivotal mounting,
each of the individual portions of the second rear wheel means being pivotable about a common shaft means, and
control means for
raising the second rear wheel means out of contact with the ground,
lowering the second rear wheel means from a raised position to a ground contacting position, and
loading said second rear wheel means while said second rear wheel means are in contact with the ground,
whereby at least a portion of the load carried by the first rear wheel means, or the first rear wheel means and the forward steerable wheel means, is transferred to the second rear wheel means.

2. The transit concrete mixer of claim 1 further characterized in that
each of said hydraulic cylinder means are located on the outside of its respective truck frame members.

3. The transit concrete mixer of claim 1 further characterized in that
said control means are arranged to be electrically operated from a location remote from the second rear wheel means, including a location at the front of the truck frame.

4. The transit concrete mixer of claim 1 further characterized in that
the second rear wheel means are self-steering.

5. The concrete transit mixer of claim 4 further characterized in that
the second rear wheel means include a hydraulic stabilizer, to thereby accommodate changes in horizontally imposed loads imposed on the second rear wheel means in the loaded position.

6. The transit concrete mixer of claim 4 further characterized in that
the second rear wheel means include a caster type axle.

7. The concrete transit mixer of claim 6 further characterized in that
the second rear wheel means includes a pair of wheel assemblies and a pair of hydraulic stabilizers, one for each wheel assembly, to thereby accommodate changes in horizontally imposed loads imposed on the second rear wheel means in the loaded position.

8. The concrete transit mixers of claim 1 further characterized in that
the concrete mixer is mounted for forward discharge.

9. The concrete transit mixers of claim 8 further characterized in that the concrete transit mixer engine is located at the front of the concrete transit mixer.

10. The concrete transit mixers of claim 8 further characterized in that the concrete transit mixer engine is located at the rear of the concrete transit mixer.

11. The concrete transit mixers of claim 8 further characterized in that the concrete transit mixer engine is located at the rear of the concrete transit mixer.

* * * * *